United States Patent
Haruno et al.

(10) Patent No.: US 11,223,247 B2
(45) Date of Patent: Jan. 11, 2022

(54) STATOR FOR ROTARY ELECTRIC MACHINE

(71) Applicant: TOYOTA JIDOSHA KABUSHIKI KAISHA, Toyota (JP)

(72) Inventors: Kentaro Haruno, Toyota (JP); Makoto Yoshikawa, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 641 days.

(21) Appl. No.: 16/054,646

(22) Filed: Aug. 3, 2018

(65) Prior Publication Data

US 2019/0052135 A1 Feb. 14, 2019

(30) Foreign Application Priority Data

Aug. 10, 2017 (JP) .............................. JP2017-154938

(51) Int. Cl.
| | |
|---|---|
| *H02K 1/20* | (2006.01) |
| *H02K 5/20* | (2006.01) |
| *H02K 3/34* | (2006.01) |
| *H02K 9/08* | (2006.01) |
| *H02K 1/27* | (2006.01) |
| *H02K 1/16* | (2006.01) |
| *H02K 3/48* | (2006.01) |
| *H02K 3/38* | (2006.01) |
| *H02K 9/19* | (2006.01) |
| *H02K 15/12* | (2006.01) |

(52) U.S. Cl.
CPC .............. *H02K 1/20* (2013.01); *H02K 1/165* (2013.01); *H02K 1/27* (2013.01); *H02K 3/38* (2013.01); *H02K 3/48* (2013.01); *H02K 5/20* (2013.01); *H02K 9/08* (2013.01); *H02K 9/19* (2013.01); *H02K 3/345* (2013.01); *H02K 15/12* (2013.01)

(58) Field of Classification Search
CPC .. H02K 9/19; H02K 1/20; H02K 9/08; H02K 1/165; H02K 1/27; H02K 3/38; H02K 3/48; H02K 3/345; H02K 15/12; H02K 5/20
USPC ............................................. 310/52–59, 194
See application file for complete search history.

(56) References Cited

U.S. PATENT DOCUMENTS

| | | | | |
|---|---|---|---|---|
| 2015/0207387 A1* | 7/2015 | Kudose | ................... | H02K 9/19 310/54 |
| 2017/0201133 A1 | 7/2017 | Hattori | | |

FOREIGN PATENT DOCUMENTS

| | | |
|---|---|---|
| CN | 104836349 A | 8/2015 |
| CN | 106505755 A | 3/2017 |
| CN | 106972668 A | 7/2017 |
| JP | S61-054836 A | 3/1986 |
| JP | H04-172937 A | 6/1992 |
| JP | 09-191594 A | 7/1997 |

(Continued)

*Primary Examiner* — Burton S Mullins
(74) *Attorney, Agent, or Firm* — Oliff PLC

(57) ABSTRACT

A stator for a rotary electric machine includes a stator core and a stator coil. The stator core includes an annular back yoke, a plurality of teeth, and a plurality of slots. The stator coil, being housed in the slots and wound around the teeth of the stator core, includes coil ends protruding from the respective end faces of the stator core in the axial direction. The rotary electric machine stator further includes an insulating sleeve which is wound around root portion of the coil end on the end face of the stator core in the axial direction and disposed along the circumferential direction of the back yoke.

4 Claims, 3 Drawing Sheets

(56) References Cited

FOREIGN PATENT DOCUMENTS

JP 2009-142031 A 6/2009

\* cited by examiner

STATOR FOR ROTARY ELECTRIC MACHINE

CROSS REFERENCE TO RELATED APPLICATION

The disclosure of Japanese Patent Application No. 2017-154938 filed on Aug. 10, 2017 including the specification, claims, drawings, and abstract is incorporated herein by reference in its entirety.

TECHNICAL FIELD

The present disclosure relates to a stator for a rotary electric machine, and more particularly to a stator for a rotary electric machine, in which stator coils are wound around a stator core, with coil ends being formed so as to protrude from respective end faces of the stator core in the axial direction.

BACKGROUND

To ensure electric insulation properties between a stator core and a stator winding in a stator for a rotary electric machine, an insulating sheet disposed between the stator core and the stator winding in a slot of the stator core. Further, to fix the stator winding, the stator winding and the insulating sheet in the slot are impregnated with varnish.

JP 2009-142031 A, which discloses a technique related to the technique of the present disclosure, notes that, in a stator for a rotary electric machine, scraps generated by pressure fitting the outer periphery of a core member into a core holder adhere to a coil portion as the rotation of the rotary electric machine rotates and insulating coating of the coil is damaged. JP 2009-142031A therefore discloses the following structure: in a gap between the outer circumferential portion of the coil bobbin fitted to the teeth portion of the stator core and the core holder, a cover member is provided, and the core holder and the cover member together cover the downstream side of the pressure fit of the stator core, so that the scraps are trapped in the covered space.

The related art ensures the electric insulation properties by disposing an insulating sheet between the stator core and the stator coil. Under certain operation environment conditions of vehicles, such as random excitation, the stator core and the stator coil may move relative to each other beyond the binding force of an adhesion binding member such as varnish that binds the stator core and the stator coil together. The relative motion between the stator core and the stator coil may break or crush the insulating sheet, thereby lowering the insulation properties of the rotary electric machine.

There is therefore a demand for a stator for a rotary electric machine in which a relative motion between the stator core and the stator coil is regulated even in an operation environment such as random excitation, so that the insulation properties can be ensured.

SUMMARY

In accordance with an aspect of the disclosure, a stator for a rotary electric machine includes a stator core including an annular back yoke, a plurality of teeth protruding from the back yoke toward an inner circumference of the back yoke, and a plurality of slots each corresponding to a space between a pair of adjacent teeth; a plurality of stator coils that are housed in the slots and wound around the teeth of the stator core, where the plurality of stator coils have coil ends protruding from respective end faces of the stator core in an axial direction; and an insulating sleeve, where the insulating sleeve is wound around a root portion of the coil end on the end face of the stator core in the axial direction and is disposed along a circumferential direction of the back yoke.

The above structure, in which the insulating sleeve is wound at the root portion of the coil end on the end surface of the stator core in the axial direction, can regulate a relative motion between the stator core and the stator coil.

In the stator for a rotary electric machine according to the disclosure, the insulating sleeve may include a plurality of refrigerant passage holes formed through the insulating sleeve toward a center axis of the stator core.

The above structure allows passage of refrigerant through the refrigerant passage holes formed in the insulating sleeve and therefore appropriately can regulate a temperature rise in the stator based on generated heat caused during the operation of the rotary electric machine including the insulating sleeve.

The stator for a rotary electric machine stator according to the present disclosure can regulate a relative motion between the stator core and the stator coil to thereby can ensure insulation properties.

BRIEF DESCRIPTION OF DRAWINGS

Embodiments of the present disclosure will be described by reference to the following figures, wherein:

FIG. 1(a) is a cross sectional view; and FIG. 1(b) is a side view without a motor case;

DESCRIPTION OF EMBODIMENTS

Figure 1:
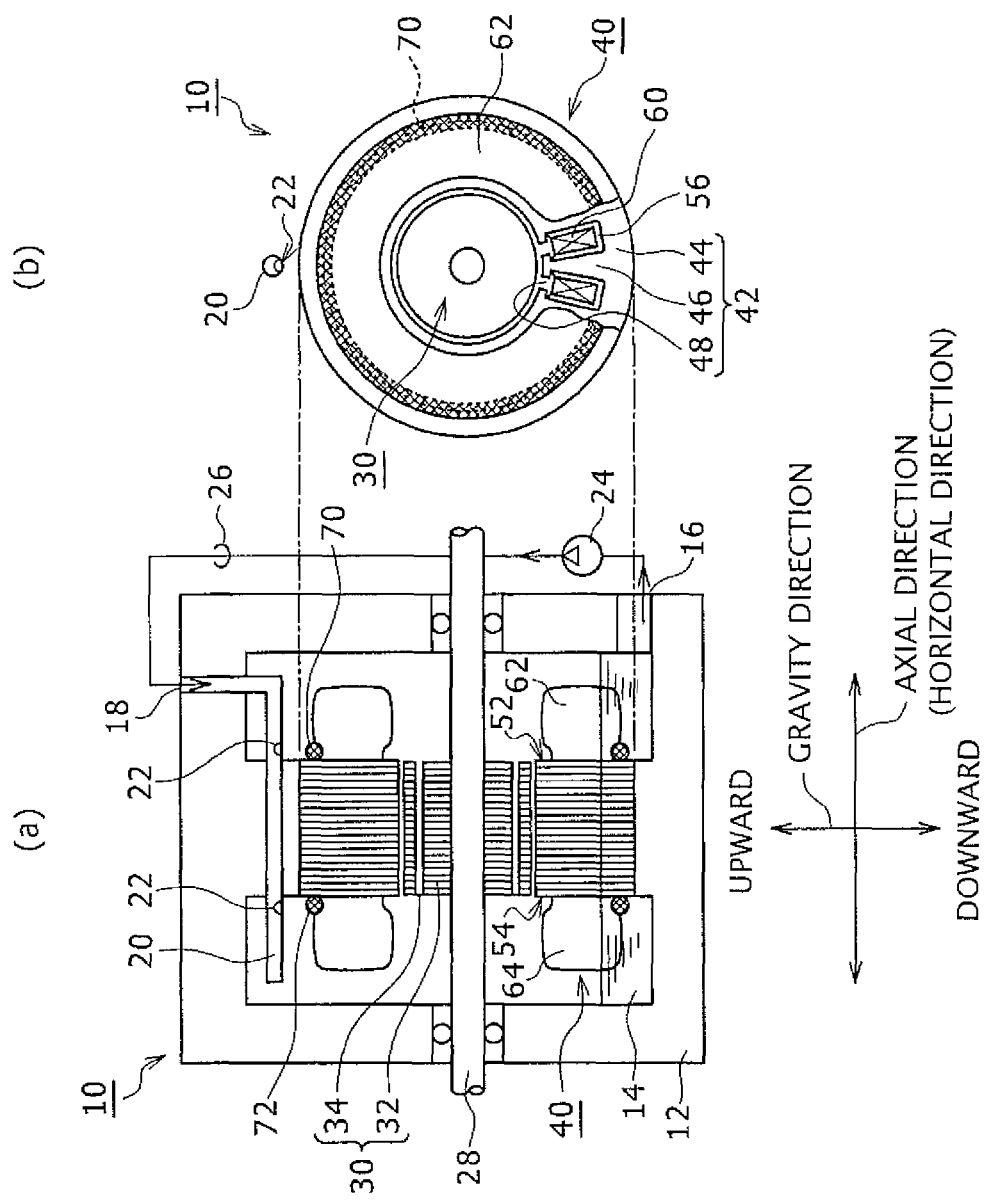
FIG. 1 illustrates a structure of a rotary electric machine including a stator for a rotary electric machine according to an embodiment.

Embodiments according to the present disclosure will be described in detail with reference to the drawings. While the following description describes a stator for a rotary electric machine (hereinafter referred to as a "rotary electric machine stator") for use in a rotary electric machine installed in a vehicle, the present disclosure is not limited to this example, and may include a rotary electric machine stator for use in a rotary electric machine which is not installed in a vehicle but is subjected to random excitation, for example. While the following description further describes a stator core including a stack of laminated electromagnetic steel sheets, and a rotor core including a stack of laminated electromagnetic steel sheets and permanent magnets embedded therein, the stator core and the rotor core may include a lamination of magnetic thin plates other than electromagnetic steel sheets, or may have other configurations. For example, in place of a core including a stack of laminated electromagnetic steel sheets, an integral core of a machined steel material or a core molded with magnetic powder may also be adopted. Further, while the following description describes stator coils that are wound by distributed winding, the present disclosure is not limited to this example and may include stator coils that are wound by concentrated winding. In the following description, similar elements are designated with similar reference numerals, and description will not be repeated.

FIG. 1 illustrates a cross sectional view of a rotary electric machine 10 to be installed in a vehicle and a side view of the rotary electric machine 10 without a motor case 12. The rotary electric machine 10 includes the motor case 12, a rotor 30 fixed to a rotation shaft 28 rotatably supported to the motor case 12, and a rotary electric machine stator 40 fixed to the motor case 12. In the following description, the rotary electric machine stator will be referred to simply as a stator 40 unless otherwise specified.

The motor case 12 is a casing that houses the rotor 30 and the stator 40 of the rotary electric machine 10 and stores a refrigerant 14 for lubrication and cooling of the rotor 30 and the stator 40. The motor case 12 includes a refrigerant outlet 16 for discharging the refrigerant 14 externally from within the motor case 12, and a refrigerant inlet 18 for supplying the refrigerant 14 into the motor case 12. The motor case 12 is fluid-tight except for the refrigerant outlet 16 and the refrigerant inlet 18.

FIG. 1 shows the gravity direction and the horizontal direction. As FIG. 1 shows the rotation shaft 28 extending in the horizontal direction, the horizontal direction corresponds to the axial direction. In the following description, the horizontal direction will be referred to as the axial direction, unless otherwise specified. The gravity direction is therefore perpendicular to the axial direction of the rotation shaft 28. When it is necessary to discriminate between opposite directions of the gravity direction, the direction toward the earth's surface with respect to the rotation shaft 28 will be referred to as the downward direction and the direction opposite to the downward direction will be referred to as the upward direction. In FIG. 1, the upper side of the sheet corresponds to the upward direction and the lower side on the sheet corresponds to the downward direction.

A refrigerant supply pipe 20 is disposed in the upper portion within the motor case 12 to extend along the axial direction. The refrigerant supply pipe 20 has a first end connected to the refrigerant inlet 18 of the motor case 12 and a second end that is sealed, and includes refrigerant drop holes 22 at appropriate locations between the first end and the second end.

A refrigerant pump 24 is a circulating pump disposed in the middle of a refrigerant circulating pipe 26 connecting the refrigerant outlet 16 and the refrigerant inlet 18 of the motor case 12. The refrigerant pump 24 pumps up the refrigerant 14 stored in the lower portion in the interior space of the motor case 12 and supplies the refrigerant 14 to the refrigerant supply pipe 20 disposed in the upper portion within the motor case 12. The refrigerant 14 dropped through the refrigerant holes 22 of the refrigerant supply pipe 20 flows downward within the motor case 12 while cooling the stator 40 and other components that generate heat during the operation of the rotary electric machine 10, and returns downward within the interior space of the motor case 12.

The refrigerant 14 may be a fluid for use in lubrication of mechanical components that are installed in a vehicle together with the rotary electric machine 10. For example, a lubricant called ATF (Automatic Transmission Fluid) used for lubrication of a power transmission mechanism installed in a vehicle may be used as the refrigerant 14 for cooling the rotary electric machine 10.

The rotor 30 includes a rotor core 32 that is a rotor of the rotary electric machine 10 fixed to the rotation shaft 28, and permanent magnets 34 embedded in the rotor core 32. The rotation shaft 28, which is an output shaft of the rotary electric machine 10, is rotatably supported at both ends on the motor case 12 via appropriate bearings. The ATF; that is, the refrigerant 14, is also used for lubrication of the bearings. The rotor core 32 is a stack of a predetermined number of magnetic thin plates laminated in the axial direction. The magnetic thin plate may be made of an electromagnetic steel sheet that is a type of silicon steel plate. An integral magnetic core may be used in place of a stack of magnetic thin plates. The permanent magnet 34 is a magnet forming a magnetic pole of the rotor 30. The permanent magnets 34, that constitute magnetic poles, in the number corresponding to the number of magnetic poles are embedded in the rotor core 32 along the circumferential direction of the rotor core 32.

The stator 40 is a stator of the rotary electric machine 10 and includes a stator core 42 and stator coils 60 wound around the stator core 42.

The stator core 42 is a component of a magnetic substance having a center hole in which the rotor 30 is disposed. The stator core 42 includes an annular back yoke 44, a plurality of teeth 46 protruding from the back yoke 44 toward the inner circumferential side, and a plurality of slots 48 corresponding to spaces between adjacent teeth 46. The side view in FIG. 1(b) is partially broken to illustrate a relationship among the back yoke 44, the teeth 46, and the slots 48 on the end face 52 of the stator core 42 in the axial direction.

The stator core 42 is a stack of a predetermined number of magnetic thin plates laminated in the axial direction; that is, molded into a predetermined annular shape including the teeth 46 and the slots 48. The magnetic thin plate may be an electromagnetic steel sheet similar to the rotor core 32. An integral magnetic substance core may be used in place of a stack of magnetic thin plates.

The stator coil 60 is three-phase distributed winding. The winding of each phase is wound such that a conductor line with insulating coating is inserted through predetermined slots 48 and is wound around a predetermined number of teeth 46 in the stator core 42. An elemental wire of the conductor line with insulating coating may be copper wire, copper-tin alloy wire, or silver plated copper-tin alloy wire, for example. The insulating coating may be polyamide-imide enamel coating. The three-phase distributed winding is described only for illustrative purpose, and concentrated winding may be adopted depending on the specifications of the rotary electric machine 10. In this case, the winding of each phase is wound such that a conductor line with insulating coating is inserted through predetermined slots 48 and is wound concentratively around a single tooth 46.

Coil ends 62 and 64 are portions of the stator coils 60 protruding outward from respective end faces 52 and 54 of the stator core 42 in the axial direction in a state in which the stator coils 60 are inserted through the slots 48 and wound around the teeth 46 of the stator core 42.

Referring to FIG. 1(b), an insulating sheet 56 placed within the slot 48 is an insulator for ensuring electric insulation between the conductor line with insulating coating of the stator coil 60 and the stator core 42. The insulating sheet 56 may be a plastic sheet having electric insulation properties that is molded into a predetermined shape.

The insulating sheet 56, the stator core 42, and the stator coil 60 are fixed with each other using an adhesion binding member (not shown), which may be varnish. Alternatively, an electrically insulating liquid resin or paint having an appropriate viscosity that is cured under an appropriate environmental condition may be used in place of varnish. Alternatively, an adhesion sheet with high viscosity, for example, may be used as an adhesive.

Each of two insulating sleeves 70 and 72 is an insulating member that is wound around the root portion of each coil end 62 or 64 on the corresponding end face 52 or 54 of the stator core 42 in the axial direction and is disposed along the circumferential direction of the back yoke 44. In other words, each of the insulating sleeves 70 and 72 is wound around the respective coil end 62 or 64 that is an assembly of the conductor lines with insulating coating, rather than around each single conductor line with insulating coating. Specifically, the insulating sleeve 70, one of the two insulating sleeves 70 and 72, is wound around the root of the coil end 62 protruding outward from the end face 52 of the stator core 42 in the axial direction and is disposed along the circumferential direction of the back yoke 44. Similarly, the insulating sleeve 72, the other one of the two insulating sleeves 70 and 72, is wound around the root of the coil end 64 protruding outward from the end face 54 of the stator core 42 in the axial direction and is disposed along the circumferential direction of the back yoke 44.

The insulating sleeves 70 and 72 regulate a relative motion between the stator core 42 and the stator coil 60 and regulate damage or crushing of the insulating sheet 56 disposed between the stator core 42 and the stator coil 60. This further prevents contact between the stator core 42 and the stator coil 60. As described above, the insulating sheet 56, the stator core 42, and the stator coil 60 are fixed with each other using an adhesion binding member such as varnish. However, under the operation environment in which the rotary electric machine 10 is subjected to significant random excitation, for example, the stator core 42 and the stator coil 60 may move relatively to each other beyond the binding force of the adhesion binding member such as varnish. The relative motion between the stator core 42 and the stator coil 60 may damage or crush the insulating sheet 56. The insulating sheet 56 which is damaged or crushed causes the stator core 42 and the stator coil 60 to contact each other, lowering the insulation properties of the rotary electric machine 10.

The insulating sleeves 70 and 72 regulate relative motion between the stator core 42 and the stator coil 60 under the operation environment in which the rotary electric machine is subjected to random excitation, to thereby avoid damage or crushing of the insulating sheet 56. This further prevents electrical contact between the stator core 42 and the stator coil 60. The insulating sleeves 70 and 72 are prepared by shaping a rodlike member made of a resin member and having electrical insulating properties into an annular shape and are wound around the root portion where the coil ends 62 and 64 rise on the end faces 52 and 54 of the stator core 42 in the axial direction. Typically, the coil ends 62 and 64 have the minimum outer diameter in the root portion. The insulating sleeves 70 and 72 wound and disposed in the root portion having a small diameter are stabilized. The rodlike member may have a cross section having an ellipse shape, a rectangular shape, or another shape, as well as a circular shape, or may have a hollow portion. The resin member having electrical insulation properties may be an epoxy resin, for example.

The rodlike member may be wound around the root portion of the coil ends 62 and 64 in the following manner, for example: a resin rodlike member having flexibility is bent and wound around the root portions of the coil ends 62 and 64 on the end faces 52 and 54 of the stator core 42 in the axial direction. The opposite ends of the wound rodlike member are then bound together using an appropriate binding member. Alternatively, a resin rodlike member, which is shaped into an annular shape having a small inner diameter, having slits, is extended, by means of elasticity of a resin, to a larger diameter and is fitted into the root portions of the coil ends 62 and 64 on the end faces 52 and 54 of the stator core 42 in the axial direction. Alternatively, synthetic rubber having electric insulating properties and thermal resistance is shaped into an annular shape, which is extended, by means of elasticity of the synthetic rubber, to a larger diameter and is fitted into the root portions of the coil ends 62 and 64 on the end faces 52 and 54 of the stator core 42 in the axial direction.

In preferred embodiments, the insulating sleeves 70 and 72 are wound around the entire outer circumference of the root portions of the coil ends 62 and 64. In some cases, the entire length of the back yoke 44 in the circumferential direction is divided into a plurality of sections, and the insulating sleeves 70 and 72 may be placed in two or more sections. The insulating sleeves 70 and 72 are fixed, by means of an adhesion binding member, to the end faces 52 and 54 of the stator core 42 in the axial direction and the root portions of the coil ends 62 and 64. The adhesion binding member may be varnish. An electrically insulative liquid resin or paint having an appropriate viscosity which is curable under an appropriate environmental condition may be used in place of varnish. In preferred embodiments, the insulating sleeves 70 and 72 are wound around the root portions of the coil ends 62 and 64 prior to dropping the adhesion binding member between the insulating sheet 56, the stator core 42, and the stator coil 60 at the coil ends 62 and 64, and thereafter the adhesion binding member is dropped. This method integrally binds the insulating sheet 56, the stator core 42, the stator coil 60, and the insulating sleeves 70 and 72 simultaneously, using the same adhesion binding member.

Figure 2A:
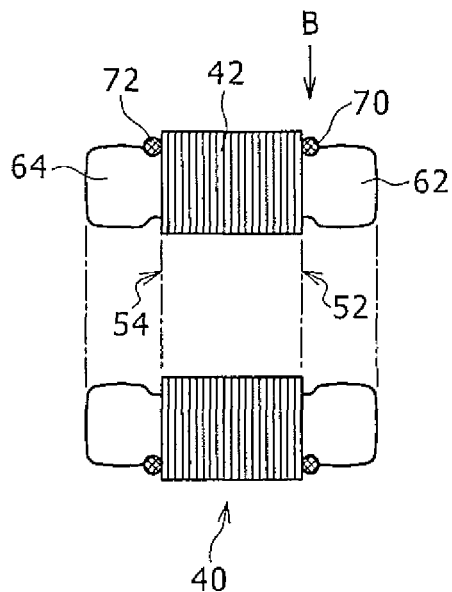
FIG. 2A is a cross sectional view of parts illustrating the rotary electric machine stator in FIG. 1.
Figure 2B:
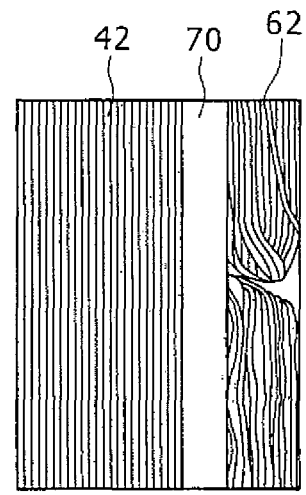
FIG. 2B is a side view of a part illustrating the rotary electric machine stator in FIG. 1.

FIG. 2A and FIG. 2B illustrate parts or a part of the stator 40 in FIG. 1. FIG. 2A is a cross sectional view of the stator 40, and FIG. 2B is a side view viewed from the direction B in FIG. 2A. In this example, the insulating sleeves 70 and 72 are solid resin members having a circular cross section.

Figure 3A:
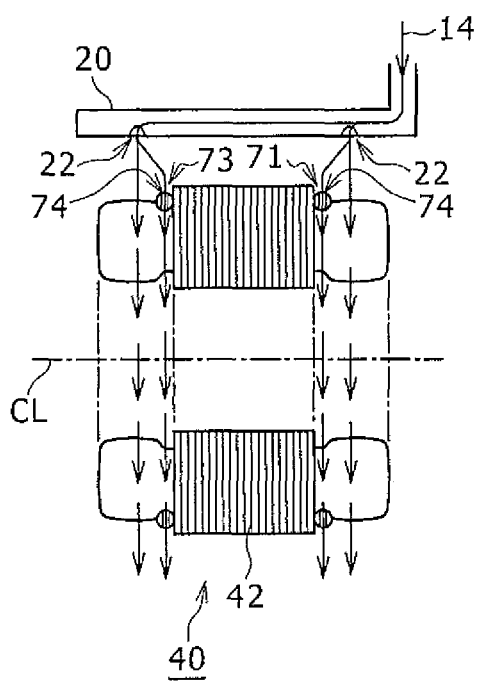
FIG. 3A illustrates a rotary electric machine stator including an insulating sleeve according to another embodiment, and corresponds to FIG. 2A.
Figure 3B:
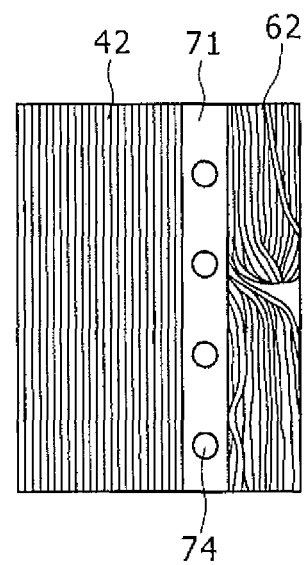
FIG. 3B illustrates a rotary electric machine stator including an insulating sleeve according to another embodiment, and corresponds to FIG. 2B.

FIG. 3A and FIG. 3B illustrate other example insulating sleeves 71 and 73. The insulating sleeves 71 and 73 include refrigerant passage holes 74 to allow passage of the refrigerant 14, rather than having a solid cross section. While FIG. 3A and FIG. 3B correspond to FIG. 2A and FIG. 2B, respectively, FIG. 3A shows the refrigerant supply pipe 20 and the refrigerant holes 22 and FIG. 3B shows the refrigerant passage holes 74 formed in the insulating sleeve 71. A plurality of refrigerant passage holes 74 are provided through the insulating sleeves 71 and 73 toward the center axis CL of the stator core 42. The refrigerant 14 dropped from the refrigerant holes 22 of the refrigerant supply pipe 20 passes through the refrigerant passage holes 74 and cools the root portions of the coil ends 62 and 64 and the stator core 42. The insulating sleeves 71 and 73 including the refrigerant passage holes 74 which allow passage of the refrigerant 14, when compared to the solid insulating sleeves 70 and 72, more appropriately regulate the temperature rise in the stator 40 based on generated heat caused during the operation of the rotary electric machine 10.

Figure 4A:
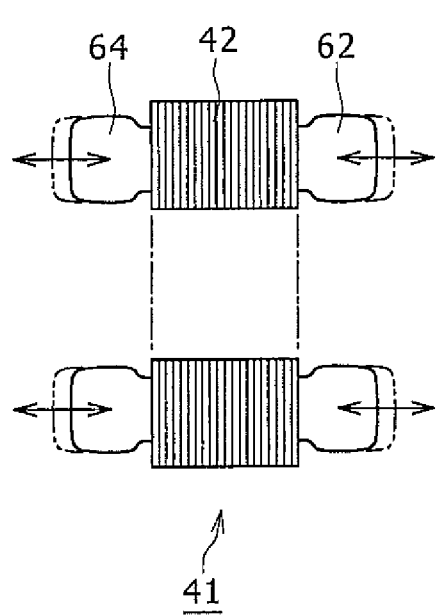
FIG. 4A illustrates a rotary electric machine stator of prior art, and corresponds to FIG. 2A.
Figure 4B:
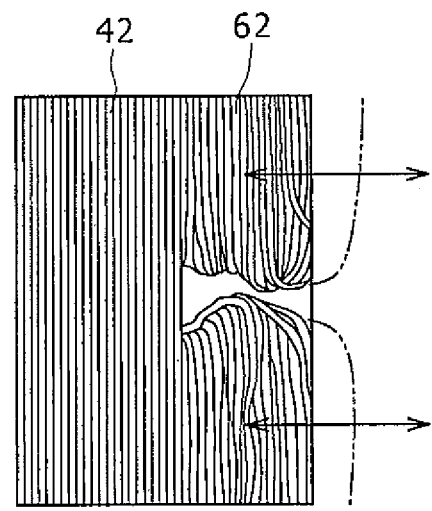
FIG. 4B illustrates a rotary electric machine stator of prior art, and corresponds to FIG. 2B.

FIG. 4A and FIG. 4B illustrate an example in which random excitation is applied to the stator 41 of prior art having no insulating sleeves. FIG. 4A and FIG. 4B correspond to FIG. 2A and FIG. 2B, respectively. Depending on the magnitude of the random excitation which is applied, the stator core 42 and the stator coil 60 may move relatively to each other beyond the binding force of the adhesion binding member such as varnish. FIG. 4A and FIG. 4B show movement of the coil ends 62 and 64 by dashed and double-dotted lines. Such relative motion between the stator core 42 and the stator coil 60 may damage or crush the insulating sheet 56. The insulating sheet 56, which is damaged or crushed, causes contact between the stator core 42 and the stator coil 60, thereby lowering the insulation properties of the rotary electric machine 10. In the examples illustrated in FIGS. 1A, 1B, 2A, 2B, 3A, and 3B, the stator core 42 and the stator coil 60 are fixed to each other by means of an adhesion binding member via the insulating sleeves 70, 72, 71, and 73. These example structures, unlike the example without the insulating sleeves 70, 72, 71, and 73, regulate relative motion between the stator core 42 and the stator coil 60 to thereby appropriately ensure the insulation properties of the rotary electric machine 10.

The invention claimed is:

1. A stator for a rotary electric machine, the stator comprising:
   a stator core including an annular back yoke, a plurality of teeth protruding from the back yoke toward an inner circumference of the back yoke, and a plurality of slots each corresponding to a space between a pair of adjacent teeth;
   a plurality of stator coils that are housed in the slots and wound around the teeth of the stator core, the plurality of stator coils having coil ends protruding from respective end faces of the stator core in an axial direction; and
   an insulating sleeve, the insulating sleeve being wound around a root portion of the coil end on the end face of the stator core in the axial direction and being disposed along a circumferential direction of the back yoke,
   wherein an entire length of the insulating sleeve in the axial direction is shorter than a length of the coil end in the axial direction.

2. The stator for a rotary electric machine according to claim 1, wherein
   the insulating sleeve includes a plurality of refrigerant passage holes formed through the insulating sleeve toward a center axis of the stator core in the radial direction, the plurality of liquid refrigerant passage holes extending in a vertical direction or in a direction that is inclined with respect to the vertical direction.

3. A stator for a rotary electric machine, the stator comprising:
   a stator core including an annular back yoke, a plurality of teeth protruding from the back yoke toward an inner circumference of the back yoke, and a plurality of slots each corresponding to a space between a pair of adjacent teeth;
   a plurality of stator coils that are housed in the slots and wound around the teeth of the stator core, the plurality of stator coils having two coil ends protruding from respective end faces of the stator core in an axial direction, the two coil ends being located on opposite sides in the axial direction; and
   two insulating sleeves, the insulating sleeves being wound around root portions of the two coil ends on the respective end faces of the stator core in the axial direction and being disposed along a circumferential direction of the back yoke,
   wherein each of the two coil ends includes a small diameter portion located in the root portion and having a small outer diameter and an inclined portion contiguous from the small diameter portion outward in the axial direction and having a diameter that increases toward an outer end of the coil end in the axial direction, and
   wherein an inner portion of each of the two insulating sleeves in a radial direction is fitted into a groove portion that is formed by the inclined portion, the small diameter portion, and the end faces of the stator core in the axial direction to be interposed between the end faces of the stator core in the axial direction and the inclined portion that are on opposite sides in the axial direction.

4. The stator for a rotary electric machine according to claim 3, wherein
   the insulating sleeve includes a plurality of liquid refrigerant passage holes formed through the insulating sleeve toward a center axis of the stator core in the radial direction, the plurality of liquid refrigerant passage holes extending in a vertical direction or in a direction that is inclined with respect to the vertical direction.

* * * * *